United States Patent Office 3,046,093
Patented July 24, 1962

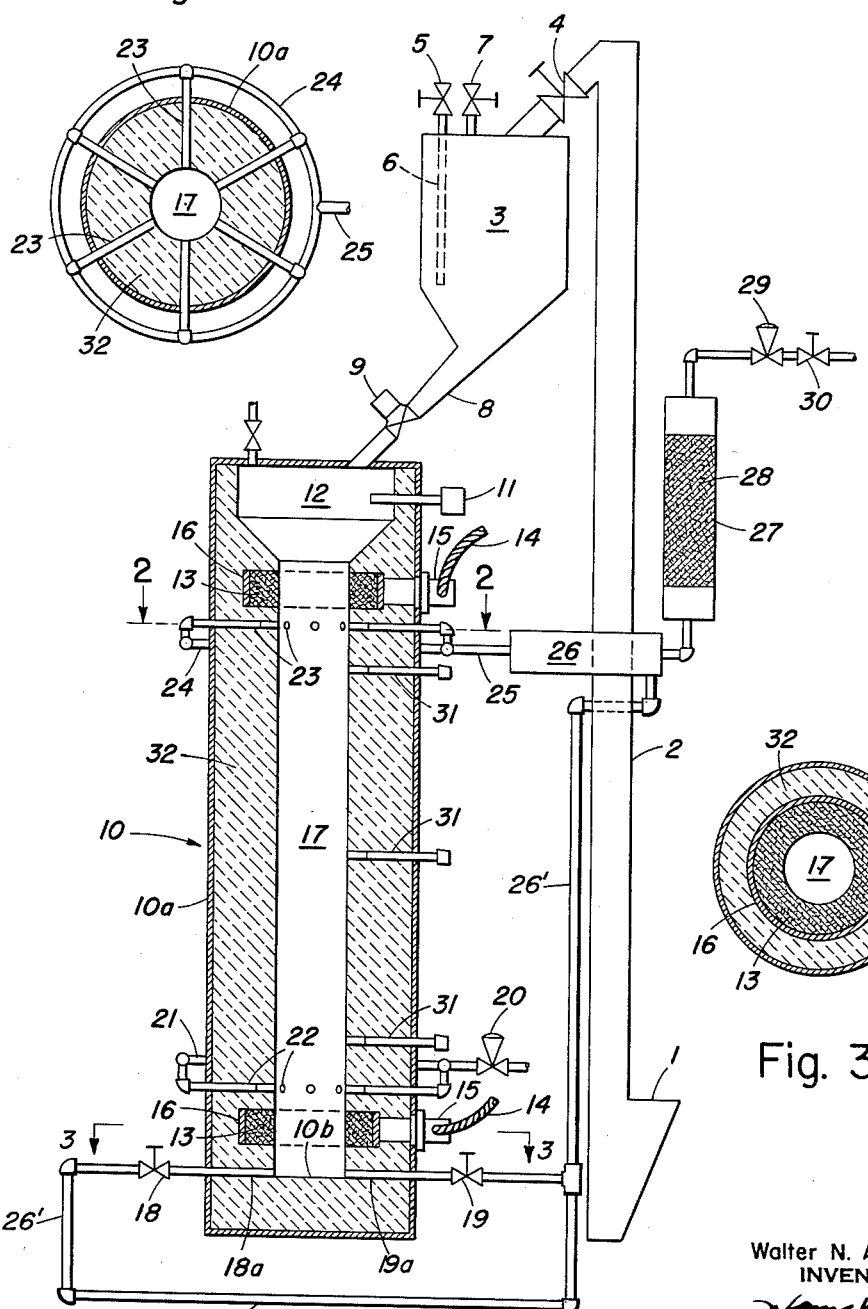

---

3,046,093
PROCESS OF MANUFACTURING
CARBON MONOXIDE
Walter N. Alexander, deceased, late of Verona, N.J., by Florence M. Alexander, executrix, Verona, N.J., assignor to General Aniline & Film Corporation, New York, N.Y., a corporation of Delaware
Continuation of application Ser. No. 539,848, Oct. 11, 1955. This application Aug. 2, 1960, Ser. No. 47,348
1 Claim. (Cl. 23—204)

This invention relates to an improved process of manufacturing carbon monoxide by the reaction of carbonaceous material with carbon dioxide in an electrothermal resistance furnace.

This application is a continuation of application Serial No. 539,848, filed October 11, 1955, now abandoned.

It is known that carbon monoxide can be manufactured by the water gas reaction route, in which case approximately 40% carbon monoxide and 50% hydrogen gas mixture is produced along with impurities. In order to produce relatively pure carbon monoxide gas, a low temperature separation process is necessary to remove the hydrogen gas. In addition, the yield of water gas is low, based on the coke charged, and does not usually exceed 50%. Additional problems are encountered in cleaning the clinkers from the grate because the metallurgical grade of coke or coal used makes this process expensive and laborious.

Carbon monoxide can also be obtained by the reaction of a hydrocarbon with steam. Natural gas and propane are chiefly used in commerce for this purpose. Although the yields are fairly high other by-products are formed such as carbon dioxide and hydrogen. In the case of natural gas, even after removing carbon dioxide gas by an amine scrubbing solution and separating hydrogen by a low temperature process, fairly large quantities of nitrogen gas contaminate the purified carbon monoxide.

In some cases, where carbon monoxide gas is desired in small quantities, coke and carbon dioxide gas are reacted to form carbon monoxide gas of from 80–88% purity. Since this reaction is endothermic, a quantity of coke (derived from coal) is blown with air and burned thus raising the temperature of the coke bed. Pure carbon dioxide is thereafter passed through the coke bed and carbon monoxide gas is produced. The intermittent type of operation results in low yields and excessive labor requirements for the "blow" and "make" periods, as well as for the removal of clinkers which often fuse to the furnace wall.

Although voluminous literature exists for manufacturing various chemical compounds of commerce by means of carbon monoxide synthesis reactions, relatively few commercial installations have been made because of the lack of simple and low cost carbon monoxide generation facilities. This has been particularly true in small scale manufacturing operations, where carbon monoxide gas is used in cylinders which is sold at a price suitable only for laboratory use or high priced chemicals manufacture.

Centralization of facilities provides the only present means of manufacturing an intermediate product such as phosgene from carbon monoxide. Phosgene is manufactured by the reaction of carbon monoxide gas and chlorine gas. Phosgene is an extremely toxic gas and great care must be exercised in its handling. Utilization of phosgene gas in cylinders is complicated by the need to carry on hand a stock of cylinders in order to carry out manufacturing operations and the serious problems relating to minimizing cylinder leakage. The cost of phosgene in cylinders is excessive for full scale exploitation of the many phosgenation reactions available to the industry today. In addition, small scale manufacture of phosgene has otherwise proven to be uneconomical because of the carbon monoxide cost, and here again the high cost has restricted its commercial development.

As noted above, the utilization of carbon monoxide gas for small scale manufacturing operations is difficult to achieve because:

(1) The carbon monoxide cost is high for small scale manufacture and the means of shipment from a central plant is uneconomical.

(2) Reactions using carbon monoxide, such as in the manufacture of methanol, ethylene glycol, etc. or for use in the Oxo and Fischer-Tropsch synthesis, are limited to large scale operations and to fixed locations where raw materials are at low cost, i.e. natural gas, by-product gases, metallurgical coke, coal, etc.

(3) No suitable small scale carbon monoxide generator is available today such as is available for the manufacture of acetylene gas from calcium carbide.

(4) Intermediate products such as phosgene are hazardous and expensive to transport and have thus far restricted many old and new applications for this product.

It has been found that coke and carbon dioxide form carbon monoxide gas very efficiently in an electrothermal resistance furnace according to the well-known reaction:

Carbon+carbon dioxide+heat yields carbon monoxide $$C + CO_2 + \text{heat} \rightarrow 2CO$$

The carbon monoxide gas so formed is of excellent purity provided that petroleum coke of low volatile content is used. In addition low ash content petroleum coke is desirable so that the operation may be made continuous by the avoidance of clinkers, thus allowing for free flow within the furnace and only occasional removal of ash.

It is an object of the present invention to manufacture carbon monoxide gas in a yield of 95% and better by use of the electrothermal resistance furnace.

It is an object of the present invention to manufacture carbon monoxide gas of exceptional purity in the range of 98 to 100% by the use of low volatile petroleum coke.

It is an object of the present invention to provide for efficient, continuous operations in the manufacture of carbon monoxide gas.

It is a further object to manufacture carbon monoxide efficiently and at low cost by means of package generators of the electrothermal resistance furnace type.

It is a further object to manufacture phosgene in conjunction with a carbon monoxide generator referred to above, so that a complete phosgene generator unit can be utilized for exploitation of phosgenation reactions.

It is a still further object to manufacture carbon monoxide gas of high purity and at a continuous rate for manufacture of products such as methanol, ethylene glycol, Fischer-Tropsch synthesis products, Oxo reaction products, hydrogen gas, etc.

It is a still further object of the present invention to provide a carbon monoxide gas generator as an adjunct to other chemical processing operations, so that a minimum of attention time would be required and such gas supply could be controlled in a manner of shutting or opening a valve in a gas pipe line.

It is an object of the present invention to manufacture metal chlorides, continuously by reacting metal oxides, petroleum coke and chlorine.

The process in brief consists of feeding low ash, low volatile petroleum coke into a reaction zone counter-current to a flow of carbon dioxide gas at a reaction temperature of 900° C.–2000° C. to produce carbon monoxide gas. The temperature is maintained by supplying the endothermic reaction with heat generated by electricity supplied between two electrodes (at the extremities of the furnace) and the resistance of the petroleum coke bed between the electrodes. The carbon monoxide gas stream is continuously removed, while petroleum coke and carbon dioxide gas are continuously charged into the furnace.

The process of the present invention will be more readily understood by reference to the attached figures of drawings in which:

FIG. 1 is a partial transverse section in elevation through the electrothermal resistance furnace showing an elevator hopper and a storage bin for the calcined petroleum coke.

FIG. 2 is a sectional view taken at the upper end of FIG. 1 showing the construction of the circular channel for the coke charge and the exit ports for the carbon monoxide gas.

FIG. 3 is a sectional view taken at the lower end of FIG. 1 showing the arrangement of the electrical conductors which supply electricity to the furnace.

*Description of Process*

In carrying out this invention, wherein carbon monoxide of high purity is generated at approximately 1 mole per hour or 28 lbs. per hour, reference is made to FIGURE 1. Petroleum coke of less than 2% ash preferably between 0.0 and 1.5% and of an approximate particle size of 1/8" and which had been previously calcined at 1000° C. is charged into hopper 1 of elevator 2 and is conveyed to storage bin 3. Valve 4 is open during the charging period. Valve 4 is then closed and the charge in bin 3 is freed of air by purging the system with nitrogen gas entering valve 5 and passing into the coke charge by means of down pipe 6. The exit gases are exhausted through valve 7. Purging of the coke in bin 3 may be also carried out by first evacuating bin 3 by means of a vacuum creating device (not shown on drawing). Valve 7 may be used for this purpose. The system can then be brought to atmospheric pressure by allowing nitrogen gas to flow through valve 5 and down pipe 6. In the case of exceptional purity requirements, the final purging should be made with carbon monoxide gas by first evacuating the storage bin as described and filling the coke bin with carbon monoxide gas through valve 5 and down pipe 6 as heretofore described.

The petroleum coke is thereafter automatically discharged from bin 3 through chute 8 by means of electrically controlled valve 9 into electrothermal resistance furnace 10. The level of coke in the furnace is maintained by level senser 11 which electrically opens and closes valve 9 as required. The level of coke is maintained in surge volume 12 and at essentially a constant level so that the level of coke cannot drop below upper electrode 13. The rate of coke feed to electrothermal furnace is controlled at approximately six pounds per hour. This rate of coke feed is satisfactory for a production rate of 28 lbs. of carbon monoxide per hour of high purity since the yields are essentially stoichiometric based on carbon charged.

Electricity is supplied by leads 14 and to copper bus bars 15, which lead to circular buses 16 within the furnace. The copper circular buses supply electricity to the carbon electrodes 13, which are fabricated of circular carbon brick.

The electrical circuit is completed by the coke bed which fills the circular channel 17 between the electrodes. The individual particles of coke are heated to the desired reaction temperature of from 900° C.–1500° C. It is to be noted that this range of temperatures can be readily accomplished in a furnace provided with standard grade refractory lining. Temperatures as high as 2000° C. may be attained in a magnesite and zirconium type refractory lined furnace. At these higher temperatures, adequate protection for electrodes can be made by providing for water cooling of the electrodes or provision for water cooling the interior or exterior of the furnace walls adjacent to the electrodes. Depending on the time requirements desired to achieve the temperature 50 to 75 kva. are necessary to obtain a preheating time of 12 to 24 hours. Depending on the resistance of the coke bed, 90 to 150 volts and currents of from 550 to 900 amperes are required to achieve the desired power input during the heating up period. Prior to proceeding with the admission of carbon dioxide gas, the electrothermal resistance furnace is purged of air by blowing nitrogen gas through valves 18 and 19 (normally closed) and exhausting the gases through valve 20. The final purging can be made with carbon dioxide and finally with carbon monoxide if desired to minimize the contaminants in the exit gas stream. It is to be noted that since the electrothermal furnace is encased in a steel shell 10a vacuum may be applied to the unit if desired to remove air and the system may then be brought back to working pressure by feeding either carbon dioxide gas (at lower temperatures where reaction does not take place) and finally carbon monoxide gas if desired to provide a completely pure exit gas atmosphere for starting up operations.

After completion of the purging operations, and after the furnace has been brought up to the desired reaction temperature in the range of 900° C. to 1500° C. approximately, carbon dioxide gas is fed to control valve 20 into ring line 21 and thereafter to furnace ports 22 equally spaced in the furnace wall. The carbon dioxide gas is fed at a rate of approximately 22 lbs. per hour which is the stoichiometric quantity of gas required for manufacture of 28 lbs. of carbon monoxide per hour. The temperature of the gas feed may be at room temperature or preheated to any desirable temperature (i.e. the outgoing carbon monoxide gas may be used to preheat the entering carbon dioxide gas by an appropriate heat exchange unit). Higher input of heat to the carbon dioxide gas prior to reaction with coke will conserve electricity but at this small scale of manufacture such savings have little effect on the overall economics.

Carbon dioxide gas reacts with the coke charge in circular channel 17 and carbon monoxide gas is formed rapidly and in a matter of 1–20 seconds the reaction is substantially complete. Gas velocities of from .1 to 25 ft./sec. and preferably from .5 to 10 ft./sec. are employed in this furnace. The carbon monoxide gas reaches the highest temperature in exiting out of the furnace ports 23, and since the greatest conversion of carbon dioxide to carbon monoxide is made at the elevated temperatures, the gas stream is substantially all carbon monoxide of a purity of 98% or better.

Electricity supplies the endothermic reaction with heat and 20–25 kilowatts are consumed per mole of carbon monoxide produced. The generation of power is at approximately 80–90 volts and 250 to 275 amperes, and although this voltage and current may vary somewhat during the course of the reaction because of changing resistance of the hot coke particles, essentially constant power input can be realized for a constant production rate. The power supply is controlled by thermoelectric elements 31 which measure internal furnace temperatures. Ascending temperatures are realized in the furnace as the reaction proceeds and the highest temperature is maintained just below the upper carbon electrode 13. The electricity flow is controlled to maintain constant temperature points in the furnace as measured by the thermoelectric elements 31, and the controlling electrical instrument allows current to flow to maintain these temperatures. Therefore at a regulated carbon dioxide gas feed, and at constant temperature, a constant production of carbon monoxide will be achieved and at a constant power input.

The carbon monoxide gas stream leaves through furnace ports 23 and thereafter to ring line 24 and to header 25 to cooler 26. The gas temperature is lowered in cooler 26 to approximately room temperature. Cooling water not shown or other means may be used such as precooling with cold feed carbon dioxide gas previously described. The cooled carbon monoxide gas then passes through carbon adsorption unit 27 where activated carbon 28 removes carbon disulfide and other carbon-sulphur compounds. This system of carbon adsorption removes the sulfur compounds very efficiently and these may be recovered if desired by blowing with steam (not shown in drawing) and by having another unit in parallel (not shown in drawing). The purified carbon monoxide, containing small quantities of carbon dioxide from 0 to 2% approximately (depending on production rate) leaves through pressure control valve 29 and shut off valve 30. If it is desired to stop the flow of gas for use in processing operations valve 30 may be shut off, resulting in increase in pressure at control valve 29. Valve 29 is regulated to cut off control valve 20 which stops the flow of carbon dioxide gas.

The furnace is properly insulated to reduce heat losses (which raise power requirements) and the brickwork 32 contains a course of suitable insulating brick.

A greater throughput of 2 moles per hour resulting in less than an equivalent consumption of power, approximately 30 to 35 kw. in total, may be realized in the same furnace at lower purity of carbon monoxide gas manufacture. The impurity is carbon dioxide gas and is readily removed by ethanolamine or caustic scrubbing solution. Thus, high purity can be obtained with high volumetric and electrical efficiency if means of recovering the carbon dioxide gas is provided. This particular modification is especially important for large scale manufacture where it may be desirable to minimize the capital cost of equipment.

In small or medium size installations it is expedient to keep the furnace continuously at the reaction temperature and in this manner a supply of carbon monoxide gas can be immediately made available by opening valve 30. The power loss is not very great for providing this standby condition for the immediate generation of gas.

In small installations it may not be economically feasible to obtain maximum electrical efficiency, while in large installations efficiencies of 80% and higher should be realized.

Petroleum coke of low ash, low volatiles and free flowing at temperature of operation is to be desired for this process. Petroleum coke in the crude form contains a substantial sulfur content and if this be the only volatile impurity the coke need not be calcined prior to the processing in the electrothermal furnace. However adequate adsorption equipment should be provided for removing carbon disulfide and like compounds.

Almost complete removal of the volatiles can be accomplished by calcining operations. Coke calcined at 1000° C. or above has a minimum of volatiles. The electrothermal furnace may be used as a calcining unit for coke if desired. The electrical energy requirements are a fraction of the energy requirements for the manufacture of carbon monoxide and thus an adequate supply of raw material can be made available from the large industrial supply of petroleum coke available from the petroleum industry.

In order to minimize electrode decomposition, the location of the electrodes in the furnace is of greatest importance. The lower electrode 13 is located below the admittance ports 22 for carbon dioxide gas so that very little carbon dioxide gas at an elevated temperature is in contact with the electrodes. The endothermic nature of the reaction also keeps the temperature low at this point. In order to prevent attack of the carbon electrode by carbon dioxide the temperature at lower electrode 13 should be below 1000° C. and preferably below 900° C. Such temperatures may be readily maintained by controlling the temperature of the carbon dioxide fed to the furnace through ring line 21, or if desired by external cooling means (not shown) such as cooling jackets or pipes conducting at heat exchange medium located near the electrode. The upper electrode 13 is located above the exit ports for carbon monoxide gas and since very little carbon dioxide gas is present in the gas exit stream very little reaction can take place at this electrode. In order to prevent attack on electrodes 13 by carbon dioxide, the design of a furnace for a specific operating condition, such as rate of feed, temperature, purity of exit gas, etc., is modified to insure the desirable conditions by relocation of inlet and exit gas ports with relation to the electrodes. For example, if an 80% gas were desired, the relative space relation of electrode to inlet gas or outlet is increased to that used for a gas of 98% purity. Alternatively, however, if desired, means may be provided for cooling upper electrode 13 to a temperature below 1000° C. and preferably below 900° C.; e.g. jackets or pipes (not shown) conducting a heat exchange fluid and located adjacent to upper electrode 13.

In order to further protect the lower electrode 13, a recycle stream of cool carbon monoxide gas may be brought into the reactor by means of recycle line 26' feeding through valves 18 and 19 entering through furnace ports 18a and 19a.

Some of the ash is carried out of the furnace by the exit gas stream and this ash may be separated by dust collection devices. Part of the fine ash settles out on the furnace floor 10b and here the ash can be blown out by use of inert gas through port 18a and out through port 19a.

Larger quantities of ash may be removed from the bottom of the furnace along with some of the coke by use of Jeffrey water cooled tubular type conveyor or other such manufacturer's standard make. The coke can then be concurrently separated from the ash and returned to the furnace.

Based on the aforementioned description of the process it has been demonstrated that this unit provides for economic manufacture on a large scale as well as for small scale plant operations. It is to be noted that such an installation is essentially independent of location since the raw material supply is available in any industrial area and electricity is generally available at low cost in the range of 4 to 10 mils per kilowatt hour.

The process of the present invention is also applicable to the manufacture of aluminum chloride by the reaction of calcined alumina, coke and chlorine gas according to the following reaction:

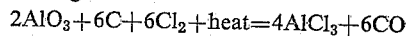

$$2AlO_3 + 6C + 6Cl_2 + heat = 4AlCl_3 + 6CO$$

Petroleum coke of low ash and volatiles and alumina of high purity such as manufactured for the electrolytic aluminum industry are used in carrying out the reaction. These two materials are intimately mixed in powdered form and fed to the electrothermal resistance furnace. The alumina and coke may be prepared as small briquettes if desired in order to allow for adequate gas flow through the furnace.

The furnace is brought to reaction temperature in the range of 1000° C. to 1200° C. by passing electricity through the coke-alumina bed as previously described in the manufacture of carbon monoxide in the electrothermal resistance furnace. Chlorine is then admitted above the lower electrode and the reaction proceeds to form aluminum chloride and carbon monoxide, which gas mixture is discharged from the furnace. Electrical energy is supplied to maintain the reaction and the bottom electrode is maintained at less than approximately 600–700° C. The circular copper buses are protected from the chlorine atmosphere by enclosing with suitable refractory. Chlorine is fed to the furnace in approximately stoichiometric quantity to avoid excess chlorine in the exit gases.

The aluminum chloride-carbon monoxide gas mixture is thereafter cooled to room temperature and thereby precipitating aluminum chloride from the gas stream. The carbon monoxide gas is thereafter recovered for further use. Other metal chlorides, such as titanium, magnesium, etc., may be produced using the system with modifications described above.

Acetylene may be produced by use of the electrothermal resistance furnace by means of the following reaction:

Coke+hydrogen+heat→acetylene

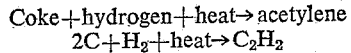

Elevated temperatures are produced by the electrothermal resistance furnace in an analogous manner to that employed for carbon monoxide gas manufacture. Only partial conversion of the hydrogen need be made, since the gas is recycled for further conversion.

Cyanogen may be also produced by the reaction of coke and nitrogen gas in an electrothermal furnace according to the following reaction:

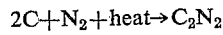

What is claimed is:

In a process for manufacturing carbon monoxide by feeding carbonaceous material into a cylindrical reaction zone containing carbon electrodes of annular form respectively near the top of the reaction zone and near the bottom of said reaction zone, the improvement which comprises feeding a low ash and low volatile content carbonaceous material at room temperature into the top of said reaction zone whereby a cylindrical column of the carbonaceous material is formed between said electrodes and conducting the electric current therebetween to heat the column of coke, feeding carbon dioxide gas into the reaction zone at a point above the electrode at the bottom of said reaction zone, and during the reaction positively cooling the electrode at the bottom of said reaction zone below the temperature of the reaction by passing a recycle stream of carbon monoxide at a temperature below the reaction temperature in effective contact with said bottom electrode, and withdrawing the carbon monoxide formed at a point below the upper electrode thereby not interfering with the cooling effect of the delivered cool carbonaceous material on the upper electrode which is thus maintained at a temperature below the reaction temperature, the electrodes, cooled below reaction temperature, being guarded against erosion and combustion of the same.

References Cited in the file of this patent

UNITED STATES PATENTS 2,625,465     Dresser et al.     Jan. 13, 1953

FOREIGN PATENTS 340,846     France     May 25, 1904